No. 792,221. PATENTED JUNE 13, 1905.
J. P. JÖRGENSEN.
MOLDING MACHINE FOR MANUFACTURING BUILDING STONE.
APPLICATION FILED MAR. 22, 1904.
2 SHEETS—SHEET 1.
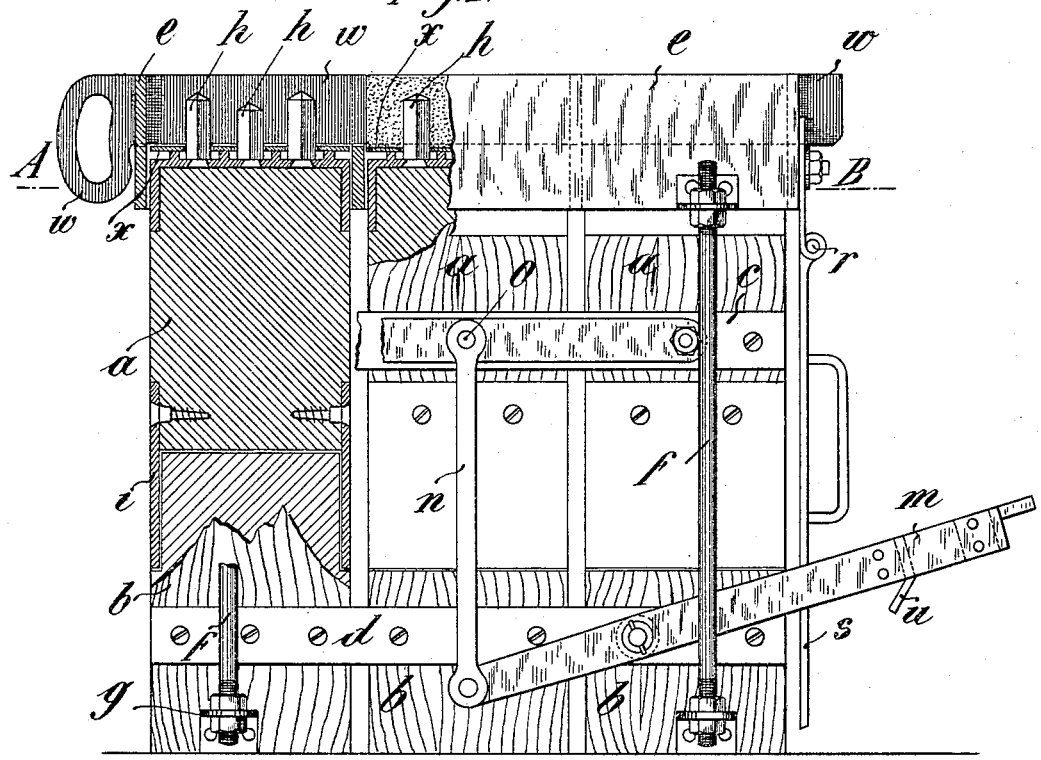
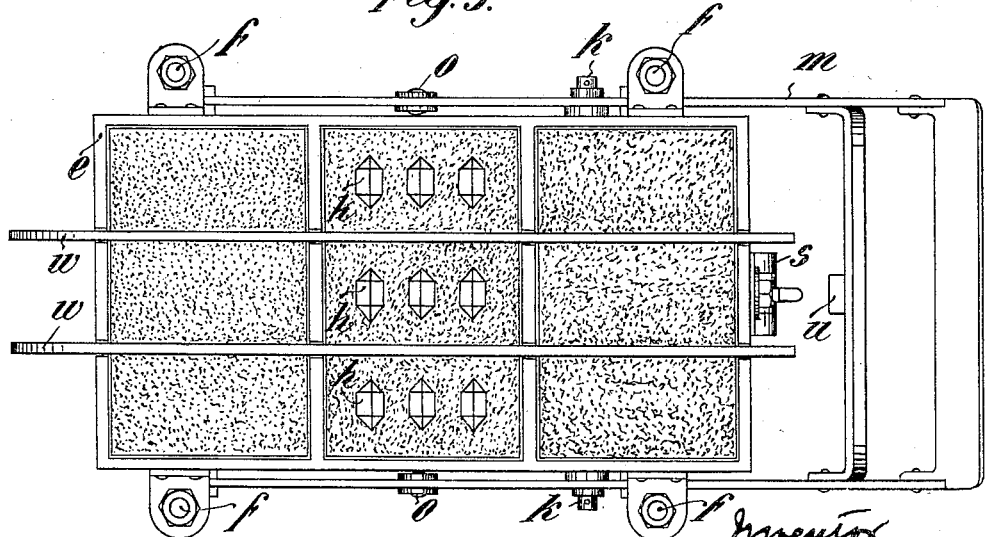

No. 792,221. PATENTED JUNE 13, 1905.
J. P. JÖRGENSEN.
MOLDING MACHINE FOR MANUFACTURING BUILDING STONE.
APPLICATION FILED MAR. 22, 1904.

2 SHEETS—SHEET 2.

Witnesses
Inventor
Jörgen Peter Jörgensen
By Knight Bros.
attys

No. 792,221.

Patented June 13, 1905.

UNITED STATES PATENT OFFICE.

JÖRGEN PETER JÖRGENSEN, OF WEDEL, GERMANY.

MOLDING-MACHINE FOR MANUFACTURING BUILDING-STONE.

SPECIFICATION forming part of Letters Patent No. 792,221, dated June 13, 1905.

Application filed March 22, 1904. Serial No. 199,351.

*To all whom it may concern:*

Be it known that I, JÖRGEN PETER JÖRGENSEN, a subject of the German Emperor, and a resident of Wedel, Englischer Berg, Holstein, Germany, have invented certain new and useful Improvements in Molding-Machines for Manufacturing Building-Stones, of which the following is a specification.

In manufacturing building-stones of hardened material the usual process is to place into a mold a ground or bottom plate, to fill the mold with the material, and to ram down the latter with a hammer, whereupon the upper surface is smoothed with a slat. When this has been done, the building-stone is taken out of the mold and put aside. This process has the drawback that on ramming down the material the hollow plate underneath the mold produces vibrations which tend to loosen the already stamped material—i. e., the texture of the building-stone is loosened by the vibrations. To avoid this drawback is the object of the present invention, which consists in placing under the bottom plates of the molding-machine a solid massive body of a resisting power, so that no vibrations will be produced on the material being stamped down.

The drawings illustrate a form of construction of such a molding-machine.

Figure 2:
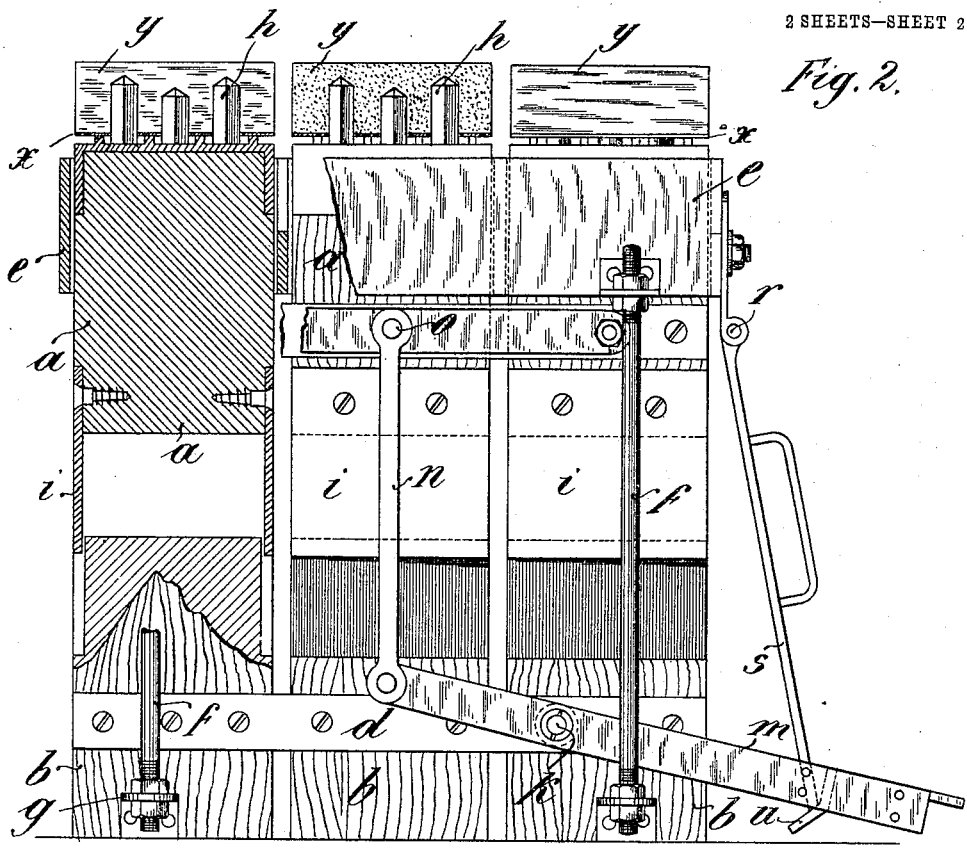
Figure 4:
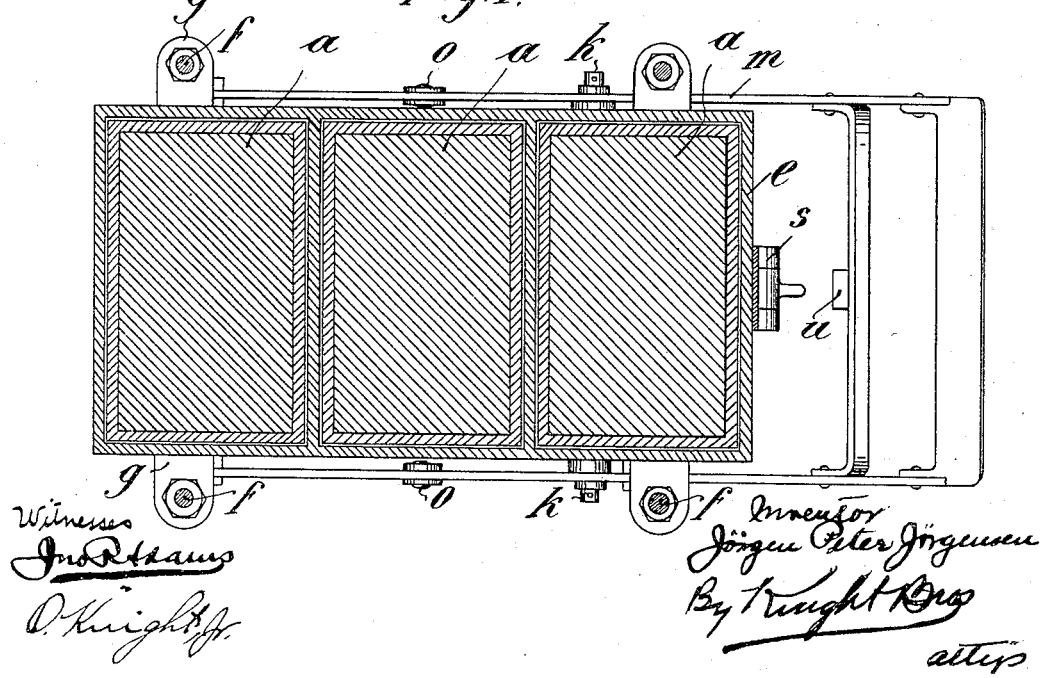

The same is shown in Figures 1 and 2, partly in a front view, partly in a vertical section, and in two different working positions. Fig. 3 is a plan or top view, and Fig. 4 a cross-section of Fig. 1 on the line A B.

Similar letters refer to similar parts throughout the several views.

This machine is constructed for the simultaneous manufacture of nine building-stones. For this purpose three divided blocks $a$ $b$ are arranged side by side and the upper halves $a$ of the blocks united by lateral slats $c$, the lower halves $b$ by slats $d$, so that they are kept in a certain relative position. Both halves $a$ and $b$ of the block are guided by suitable slats or a socket $i$, arranged on one of the blocks. The frame $e$ of the mold, divided into compartments, is united, through vertical bars $f$ and angles $g$, with the lower halves $b$ of the block, so that thereby it is held rigidly in its position. The upper halves of the blocks, if the machine is intended for manufacturing perforated stones, may be provided at their upper ends with pins $h$. Their up-and-down motion is effected by a U-shaped bow or yoke $m$, turning on the bolts $k$, which is connected with the upper halves of the blocks through racks $n$, turning on $o$. In order to retain the upper halves of the blocks in this raised position, a check-lever $s$, turning on $r$, may be provided, which bears against the projection $u$ on the bow $m$.

The longitudinal partition-walls $w$ of the frame of the mold are preferably so constructed that they may be withdrawn and inserted and guided in slits at the top of the frame.

In order to manufacture building-stones, the bottom plates $x$ are first put in. Then the partition-walls $w$ are inserted into the frame of the mold, which has been brought into the position shown in Fig. 1, and the latter is filled with the material. After ramming down the same the partitions $w$ are withdrawn. Then by stepping with the foot upon the U-shaped bow $m$ and securing it through the lever $s$ the blocks $a$, with their bottom plates $x$ and the finished stones $v$, are brought into the position shown in Fig. 2, whereupon they may be taken out at the top with the plates and put away to be dried.

For the sake of distinctness some of the stones are not shown in Figs. 1 and 2 in order to be able to illustrate the partitions $w$ and also the pins $h$ in the front view.

The movable partitions $w$ have the advantage that one bottom plate may at the same time be used for several stones—for instance, in the form of construction shown in the drawings, for three.

The frame $e$ of the mold may be raised and lowered by means of the screw-nuts on the bar $f$.

What I claim as my invention, and desire to secure by United States Letters Patent, is—

1. In a machine for manufacturing building-stones, the combination with the mold-box, of bottom plates loosely fitted within the mold-box, a solid lower supporting-block, a solid upper supporting-block normally resting with its entire under surface in contact with the entire upper surface of said lower block, means rigidly connecting the mold-box to the lower block, and means for reciprocating the upper supporting-block and the bottom plates within the mold-box.

2. In a machine for manufacturing building-stones, the combination with the mold-box, of bottom plates loosely fitted within the mold-box, a solid lower supporting-block, a solid upper supporting-block normally resting on the top of said lower block, means rigidly connecting the mold-box to the lower block, means for reciprocating the upper supporting-block and the bottom plates within the mold-box, and means depending from the upper block and surrounding the lower block for guiding the reciprocation of the upper block.

3. In a molding-machine for manufacturing building-stones, the combination with the mold-box, of a plurality of bottom plates loosely fitted within the mold-box, a plurality of fixed lower supporting-blocks, lateral slats securing said blocks together, a plurality of upper supporting-blocks normally resting on the top of said lower blocks, and having telescoping connection with the mold-box and the lower blocks, lateral slats securing said upper blocks together, means rigidly connecting the mold-box to the lower blocks, and means for imparting vertical reciprocation to the upper blocks and the bottom plates.

4. In a molding-machine for manufacturing building-stones, the combination with the mold-box, of removable diaphragms fitted in the mold-box, a plurality of bottom plates loosely fitted within the mold-box, a plurality of fixed lower supporting-blocks, lateral slats securing said blocks together, a plurality of upper supporting-blocks normally resting on said lower blocks and having telescoping connections with the mold-box and the lower blocks, lateral slats securing said upper blocks together, a plurality of rods secured to the lower blocks and to the mold-box for rigidly connecting said parts, a foot-lever pivoted to the lower blocks and connected with the upper blocks for imparting vertical reciprocation thereto, and a lever secured to the mold-box and adapted to engage said foot-lever for securing the upper blocks in an elevated position.

The foregoing specification signed at Berlin, Germany, this 27th day of February, 1904.

JÖRGEN PETER JÖRGENSEN.

In presence of—
HENRY HASPER,
WOLDEMAR HAUPT.